(12) United States Patent
Quick et al.

(10) Patent No.: US 6,291,806 B1
(45) Date of Patent: Sep. 18, 2001

(54) PROCESS FOR BONDING WORKPIECES

(75) Inventors: Nathaniel R. Quick, Lake Mary, FL (US); Tao Li, Newark, DE (US); Robert Malanga, Monroe, CT (US)

(73) Assignee: USF Filtration and Separations Group, Inc., Timonlum, MD (US)

( * ) Notice: Subject to any disclaimer, the term of this patent is extended or adjusted under 35 U.S.C. 154(b) by 0 days.

(21) Appl. No.: 09/408,749

(22) Filed: Sep. 30, 1999

Related U.S. Application Data

(60) Provisional application No. 60/102,590, filed on Oct. 1, 1998.

(51) Int. Cl.$^7$ .............................. H05B 6/10; B01D 29/20
(52) U.S. Cl. ...................... 219/633; 219/603; 219/85.12; 219/635; 210/493.5; 419/48; 392/418; 228/124.6; 228/121
(58) Field of Search ..................................... 219/633, 603, 219/634, 635, 78.01, 85.12; 228/121, 122.1, 175, 190, 193, 227, 228, 229, 230, 124.6; 210/493.5, 493.2; 419/2, 4, 48; 392/417, 418

(56) References Cited

U.S. PATENT DOCUMENTS

| | | |
|---|---|---|
| 2,413,991 | 1/1947 | Newman . |
| 2,642,187 | 6/1953 | Bell . |
| 2,877,903 | 3/1959 | Veres . |
| 2,957,235 | 10/1960 | Steinberg . |
| 3,379,000 | 4/1968 | Webber et al. . |
| 3,490,902 | 1/1970 | Fisher . |
| 3,505,038 | 4/1970 | Luksch et al. . |
| 3,716,347 | 2/1973 | Bergstrom et al. . |
| 4,114,794 | 9/1978 | Storms . |
| 4,169,059 | 9/1979 | Storms . |
| 4,338,380 * | 7/1982 | Erickson et al. ...................... 228/120 |
| 4,428,494 * | 1/1984 | Hirota et al. .......................... 220/270 |
| 4,639,388 * | 1/1987 | Ainsworth et al. ................... 428/117 |
| 4,676,842 | 6/1987 | Nazmy . |
| 4,731,184 | 3/1988 | Ostreicher et al. . |
| 4,875,616 | 10/1989 | Nixdorf . |
| 5,028,330 | 7/1991 | Caronia et al. . |
| 5,039,413 | 8/1991 | Harwood et al. . |
| 5,230,760 | 7/1993 | Tanabe . |
| 5,298,160 | 3/1994 | Ayers et al. . |
| 5,304,330 | 4/1994 | Tatarchuk et al. . |
| 5,308,370 * | 5/1994 | Kraft et al. ............................ 55/487 |
| 5,350,515 | 9/1994 | Stark et al. . |
| 5,395,039 | 3/1995 | Koehler et al. . |
| 5,472,537 | 12/1995 | Friel et al. . |
| 5,545,323 | 8/1996 | Koehler et al. . |
| 5,665,479 | 9/1997 | Vandamme et al. . |
| 5,677,088 | 10/1997 | Kobayashi . |
| 5,679,441 | 10/1997 | Saelens et al. . |
| 5,717,985 | 2/1998 | Labombard et al. . |
| 5,728,490 | 3/1998 | Edgington et al. . |
| 5,812,925 * | 9/1998 | Ecer ..................................... 428/548 |
| 5,851,647 | 12/1998 | Foster . |
| 5,904,846 | 5/1999 | Clements et al. . |
| 6,013,376 | 1/2000 | Yenni, Jr. . |
| 6,017,583 | 1/2000 | Gass . |
| 6,180,909 | 1/2001 | Quick et al. . |
| 6,200,523 | 3/2001 | Quick et al. . |

FOREIGN PATENT DOCUMENTS

| | | |
|---|---|---|
| 57-80018 * | 5/1982 | (JP) . |
| 58-137418 | 8/1983 | (JP) . |
| 1037739 | 2/1998 | (JP) . |

* cited by examiner

*Primary Examiner*—Philip H. Leung
(74) *Attorney, Agent, or Firm*—Frijouf, Rust & Pyle, P.A.

(57) ABSTRACT

The process of bonding a first workpiece to a second workpiece is disclosed comprising the steps of fabricating a sintered bonding pad formed from a matrix of randomly oriented metallic fibers. The bonding pad is interposed between the first and the second workpiece and the first and second workpieces are biased into engagement with the bonding pad. Heat is applied to the first workpiece to the second workpiece for transforming substantially all of the metallic fibers into a liquid for bonding the first workpiece to the second workpiece.

13 Claims, 10 Drawing Sheets

INFRARED HEATING

INDUCTION HEATING

PROCESS FOR BONDING WORKPIECES

CROSS-REFERENCE TO RELATED APPLICATIONS

This application claims benefit of United States Provisional application Ser. No. 60/102,590 filed Oct. 1, 1998. All subject matter set forth in application Ser. No. 60/102,590 is hereby incorporated by reference into the present application as if fully set forth herein.

BACKGROUND OF THE INVENTION

1. Field of the Invention

This invention relates to bonding and more particularly to an article and method for bonding a first workpiece to a second workpiece by localized heating.

2. Background of the Invention

The prior art has known various types of apparatuses and methods for bonding a first workpiece to a second workpiece. One popular method of affixing a first workpiece to a second workpiece is through the use of a brazing material. In a brazing process, a brazing material is disposed between a first and a second workpiece. When the brazing material and the first and second workpiece is elevated to a higher temperature, the brazing material liquifies to bond to the first and second workpiece. Upon solidification upon the removal of heat, the brazing material solidifies for bonding the first workpiece to the second workpiece. In general, the brazing material is a different material than the first and second workpieces thereby having a lower melting temperature. This ensures that the brazing will liquify upon the application of heat prior to any melting or liquefication of the first and second workpiece. Accordingly, the first and second workpieces are maintained intact and are not adversely affected by the application of heat.

Another type of process of bonding a first and second workpiece involves a welding process. In a welding process, a portion of a first and a second workpiece is liquified or melted with the liquified material from the first and second workpieces being allowed to co-mingle as a liquid. Upon the removal of heat, the co-mingled liquified materials are solidified thereby bonding the first workpiece to the second workpiece. The welding process has distinctive advantage over the brazing process in that the bond between the first and second workpieces are formed from the same material as the first and second workpieces. Secondly, the bond between the first and second workpieces is essentially as strong as the workpieces themselves. An unfortunate occurrence of the welding process is the deformation or partial melting or liquefication of a portion of each of the first and second workpieces.

Others in the prior art have used a sinter bond between metallic filter media and another metal component of a filter assembly. The sinter bond was produced by joining the parts through a diffusion bonding membrane. The membrane comprised a web of small diameter metal fibers which were sinter bond to both the filter media and the other filter part. Although the sinter bond provided an adequate bond between the filter media and another metal component of a filter assembly, the bond did not have sufficient strength for many operations and uses.

U.S. Pat. No. 2,642,187 to Bell discloses a replaceable filter unit of the character described comprising a pleated filter body of resin-impregnated paper arranged in tubular form and with the pleats extending substantially radially, end discs of the same material as the filter body closing off opposite ends of the body, said discs being bonded by a thermosetting resin adhesive to opposite end edges of said pleats, said adhesive lying between under faces of said discs and corresponding end edges of said pleats in contact therewith, and having turned down rims bonded adhesively by thermosetting resin adhesive to folds of the pleats, said adhesive lying between inner faces of the turned down rims and the folds of the pleats in contact therewith.

U.S. Pat. No 2,877,903 to Veres discloses a unit for filtering particulate matter from a fluid flowing therethrough, a hollow filter body comprising a screen equipped with a screen closure at one end thereof, a cap substantially closing the other end of said screen body and defining connecting means for communicating the interior of said filter body with a fluid flow line, and a mass of pellets defining a substantially continuous coating along the outer surface of the screen end closure and screen body and being bonded to each other and to the screen body and end closure to form an integrated structure therewith, whereby both said screen body and screen end closure define filtering areas through which fluid may pass to the interior of the screen body.

U.S. Pat. No. 2,957,235 to Steinberg discloses a method of assembling first and second elements composed of a mixture of powdered metal and resinous binder comprising placing said first element on a support, heating said first element until said resin binder therein becomes pliable without the element losing shape, placing said second element against said first element, applying pressure to said second element until a bond is formed by the resinous binder between said first and second elements, removing the elements from said support, cooling the assembly of said elements, supporting said assembly with sinter material in a sintering zone, and sintering said assembly into a unitary sintered structure.

U.S. Pat. No. 3,379,000 to Webber et al discloses a tow of metal filaments each having a maximum cross-section of less than approximately 10 microns and a length of approximately 50 feet and having a trace amount of a different material diffused in the outer surface thereof.

U.S. Pat. No. 3,490,902 to Fisher discloses a method for forming porous structures useful, for example, as filters, diffusion membranes, sound absorbers, and the like. The structures contain a sintered metal portion at least one surface of which having embedded and bonded thereto a reinforcing member. Some of the fibers in the fiber metal portion are bonded to each other and to the reinforcing member.

U.S. Pat. No. 3,505,038 to Luksch et al. discloses a mass comprising a plurality of randomly disposed hair-like substantially solid metal fibers, wherein said fibers are substantially free from particles of degradation and air transportable, and wherein said mass has resilient loft, substantial uniformity of density and distribution of voids, handlable green strength, and a density range of from one percent to eighty-five percent.

U.S. Pat. No. 3,716,347 to Bergstrom et al. discloses metal parts joined together with sintered powdered metal by applying a mixture of powdered metal and an organic heat-fugitive binder to the parts at the locus of the joint to be formed therebetween, assembling the parts in their desired joined configuration, and heating the assembly to volatilize or burn-off the binder and sinter the powdered metal.

U.S. Pat. No. 4,114,794 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,169,059 to Storms discloses an autogenous or sinter bond between metallic filter media and other metal components of a filter assembly is produced by joining the parts through a diffusion bonding membrane. The membrane comprises a web of small diameter metal fibrils which will sinter bond to both the filter media and the other filter parts to form a physically strong and leak-free seal.

U.S. Pat. No. 4,290,889 to Erickson discloses a new and unique means for preventing the crowns of a backflushable filter element unit from splitting which has heretofore been caused by the cyclic action of the cleaning and backflushing. A layer of staple material is positioned adjacent the outer layer of filter media to prevent bellowing or ballooning. An additional staple layer may be positioned adjacent the inner layer of filtered media to provide additional support. With both staple layers in position on both sides of the filter media, the media is firmly captured and the crowns will not split.

U.S. Pat. No. 4,676,843 to Nazmy discloses two component workpieces consisting of different superalloys or of the same superalloy are bonded together to form a monolithic whole, with the insertion of a layer consisting of a powder of composition similar to or identical to that of the component workpieces by hot pressing in accordance with the diffusion bonding process. The workpiece surfaces to be bonded do not have to have narrow tolerances, but are with advantage provided with grooves. The process is suitable for the bonding together of component workpieces consisting of a dispersion-hardened, nickel-based superalloy or of component workpieces of such an alloy and workpieces consisting of a cast conventional superalloy.

U.S. Pat. No. 4,875,616 to Nixdorf discloses a method for producing a high temperature, high strength bond between a ceramic shape and a metal substrate, such as joining a ceramic cap to a piston for an internal combustion engine. The composite joint is effected through the use of a ceramic preform fabricated using fibers, whiskers, platelets or sponge-like particles having the same composition as the ceramic body. The preform is joined to the ceramic shape by using a ceramic slip having a ceramic corresponding in composition with the ceramic body, with this juncture being heated to achieve a secure bond. The preform is joined to the metal substrate by first infiltrating the preform with molten material corresponding to the substrate, and then pressure bonding the infiltrated preform to the substrate after the molten material has solidified. The substrate can be metal or metal alloy. An example is given for the bonding of silicon carbide to a 300 series aluminum.

U.S. Pat. No. 5,230,760 to Tanabe discloses a filter cartridge of micro filtration membrane pleats type, by which it is possible to stably manufacture products of high quality and to reduce the manufacturing cost. In the method for manufacturing a filter cartridge of micro membrane pleats according to the present invention, an initial portion and a last portion with pleats of a micro filtration membrane are welded together to prepare an endless micro membrane, and a filter element provided with a micro filtration membrane is welded on two end plates. A thin bonding auxiliary plate made of the same material as the end plates, having an opening at its center and molten at relatively low temperature, is welded to filter element and end plates which are heated in advance.

U.S. Pat. No. 5,350,515 to Stark et al. discloses a filter cartridge including a cylindrical filter medium potted into a top cap, and having an internally potted bottom closure molded in place inside the filter medium.

U.S. Pat. No. 5,395,039 to Koehler et. al. discloses such a braze material and process. The same braze material and process is disclosed by a prior NICROBRAZ Technical Bulletin of 1991 published by the Wall Colmony Corporation regarding a braze material sold under the trademark "NICROBRAZ".

U.S. Pat. No. 5,545,323 to Koehler et al. discloses a filter assembly and a method of making a filter assembly described wherein a filter pack is seated in an end cap and contacted with a particulate material and a settling liquid of low viscosity to form a filter assemblage. The filter assemblage is sintered to form a strong, virtually impermeable bond therebetween.

It is an object of the present invention to provide an article and process for bonding a first workpiece to a second workpiece having the advantages of the brazing, welding and sinter bonding without the disadvantages of either of the processes.

Another object of this invention is to provide an article and process for bonding a first workpiece to a second workpiece utilizing a bonding pad of the same material as the first and second workpieces.

Another object of this invention is to provide an article and process for bonding a first workpiece to a second workpiece having a greater strength than the sinter bonding of the prior art.

Another object of this invention is to provide an article and process for bonding a first workpiece to a second workpiece utilizing a bonding pad of the same material as the first and second workpieces wherein the bonding pad melts or liquifies prior to the melting or liquefication of a portion of the first and second workpieces.

Another object of this invention is to provide an article and process for bonding a first workpiece to a second workpiece utilizing a bonding pad of the same material as the first and second workpieces which does not adversely flow upon liquefication of the bonding pad.

Another object of this invention is to provide an article and process for bonding a first workpiece to a second workpiece that is capable of withstanding a cleaning solvent and an elevated temperature.

Another object of this invention is to provide an article and process for bonding a first workpiece to a second workpiece upon the application of localized heat sufficient for transforming metallic fibers into a liquid for bonding the first workpiece to the second workpiece.

Another object of this invention is to provide an article and process for bonding a first workpiece to a second workpiece upon the application of infrared heat between the first and second workpiece for transforming metallic fibers into a liquid for bonding the first workpiece to the second workpiece.

Another object of this invention is to provide an article and process for bonding a first workpiece to a second workpiece upon the application of induction heat between the first and second workpiece for transforming metallic fibers into a liquid for bonding the first workpiece to the second workpiece.

Another object of this invention is to provide an article and process for bonding a first workpiece to a second workpiece that is economical to be used in a wide variety of applications.

Another object of this invention is to provide an article and process for bonding a first workpiece to a second workpiece that provides a reliable bond for use over an extended period of time.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an article for bonding a first workpiece to a second workpiece. The article comprises a matrix of metallic fibers being substantially randomly oriented in at least one geometric plane. Each of the metallic fibers are joined to adjacent metallic fibers through surface bonds from a sintering process to form the bonding pad. The pad is positionable between the first and second workpiece for enabling the bonding pad to bond to the first and second workpieces upon the application of localized heat sufficient to melt the matrix of metallic fibers.

In a more specific example of the invention, the application of localized heat includes directing heat between the first and second workpiece for transforming said metallic fibers into a liquid for bonding the first workpiece to the second workpiece. The application of localized heat may include directing infrared radiation or induction heating between the first and second workpiece.

In another specific example of the invention, each of the metallic fibers is formed in a wire drawing process. Each of the metallic fibers having a cylindrical diameter to provide a uniform diameter for the metallic fibers.

The bonding pad comprises a resilient pad formed from a sintered matrix of randomly oriented metallic fibers formed into a web. In one embodiment of the invention, the bonding fibers comprise a resilient pad formed from an uncompressed sintered matrix of randomly oriented metallic fibers. In another embodiment of the invention, the bonding pad comprises a partially compressed sintered matrix of randomly oriented metallic fibers.

The application of heat transforms the metallic fibers into a liquid for bonding the first workpiece to the second workpiece. The application of heat melts all of the matrix of metallic fibers to adhere to the first workpiece to the second workpiece.

The invention is also incorporated into the process of bonding a first workpiece to a second workpiece, comprising the steps of fabricating a bonding pad from a matrix of metallic fibers. The bonding pad is interposed between the first and the second workpiece. Localized heat is applied to melt the matrix of metallic fibers of the bonding pad to bond the first workpiece to the second workpiece. The localized heat may include directing infrared radiation or induction heating between the first and second workpiece.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
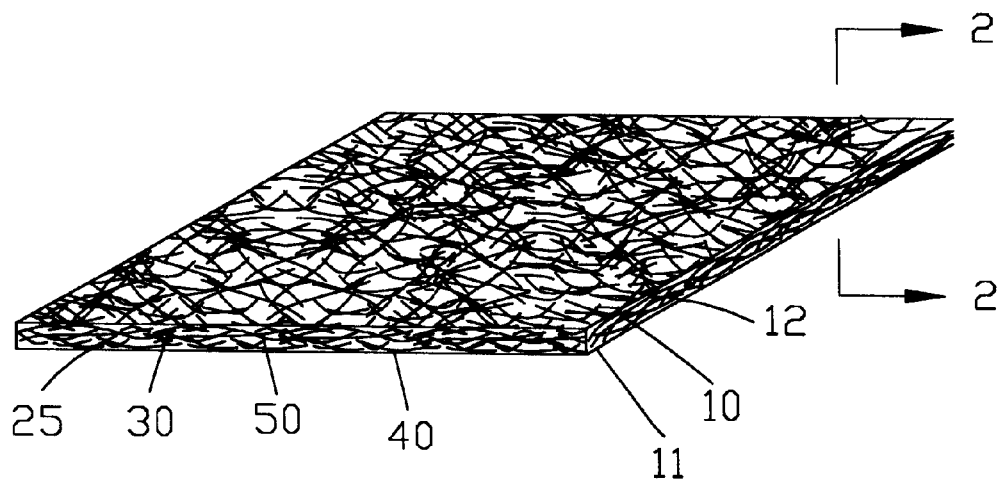
FIG. 1 is an isometric view of a first embodiment of the bonding pad of the present invention.

FIG. 1 is an isometric view of the bonding pad 10 of the present invention. The bonding pad 10 of the present invention defines a first side 11 and a second side 12. The bonding pad 10 is adapted for bonding a first workpiece 21 to a second workpiece 22 shown in FIGS. 3–6.

The first and second workpieces 21 and 22 may be metallic workpieces, ceramic workpieces or any other type of workpiece that is capable of accommodating a high temperature. In this example of the invention, the first and second workpieces 21 and 22 are shown as solid metallic workpieces.

Figure 2:
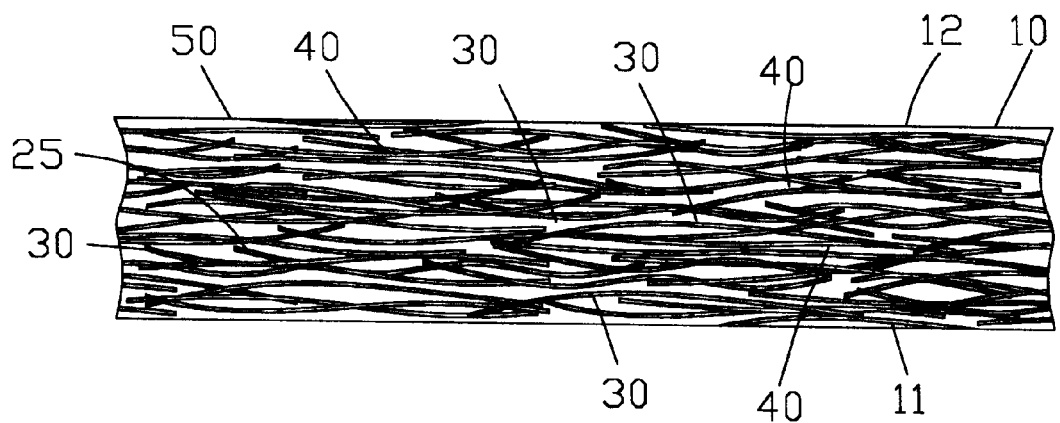
FIG. 2 is a magnified sectional view along line 2—2 in FIG. 1.

FIG. 2 is a magnified sectional view along line 2—2 in FIG. 1. The bonding pad 10 comprises a matrix 25 of metallic fibers 30. The matrix 25 of metallic fibers 30 are substantially randomly oriented in at least one geometric plane shown as a horizontal plane in FIG. 2.

Preferably, each of the metallic fibers 30 is substantially cylindrical having a cylindrical outer surface 40. The metallic fibers 30 may be formed in a wire drawing process to provide a uniform outer diameter for each of the metallic fibers 30. In one example of the invention, the metallic fibers 30 have a cylindrical diameter less than 50 micro meters.

The metallic fibers 30 are formed into a bonding pad 10. The outer surface 40 of each of the metallic fibers 30 is joined to adjacent outer surface 40 of the metallic fibers 30 through surface bonds. The surface bonds joining the adjacent outer surface 40 of the metallic fibers 30 is formed through a sinter bonding process. The bonding pad 10 comprises a sintered matrix 25 of metallic fibers 30 formed into a sintered membrane 50.

In one embodiment of the invention, the bonding pad 10 comprises a resilient pad formed from a porous sintered matrix 25 of randomly oriented metallic fibers. The resilient pad is formed from an uncompressed sintered matrix 25 of the randomly oriented metallic fibers 30. In another embodiment of the invention, the bonding pad 10 comprises a partially compressed sintered matrix 25 of randomly oriented metallic fibers 30.

During the sintering process, each of the metallic fibers 30 of the matrix 25 of randomly oriented fibers 30 are bonded to adjacent fibers 30 by heating at a temperature below the melting points of the metallic fibers 30. The mechanisms operating during the sintering process include vapor and/or liquid transport, diffusion and plastic flow. The predominant mechanisms operating during the sintering process is diffusion.

Diffusion flow is based on the concept that a certain concentration of vacancies exists in the crystal lattice of the metal fibers 30. The concentration of vacancies exists in the crystal lattice of the metal fibers 30 is a function of temperature. The concentration of vacancies in the crystal lattice of the metal fibers 30 increase as a function of temperature. The concentration of vacancy in the crystal lattice of the metal fibers 30 is also a function of the chemical potential or stress of the metal surface.

Figure 3:
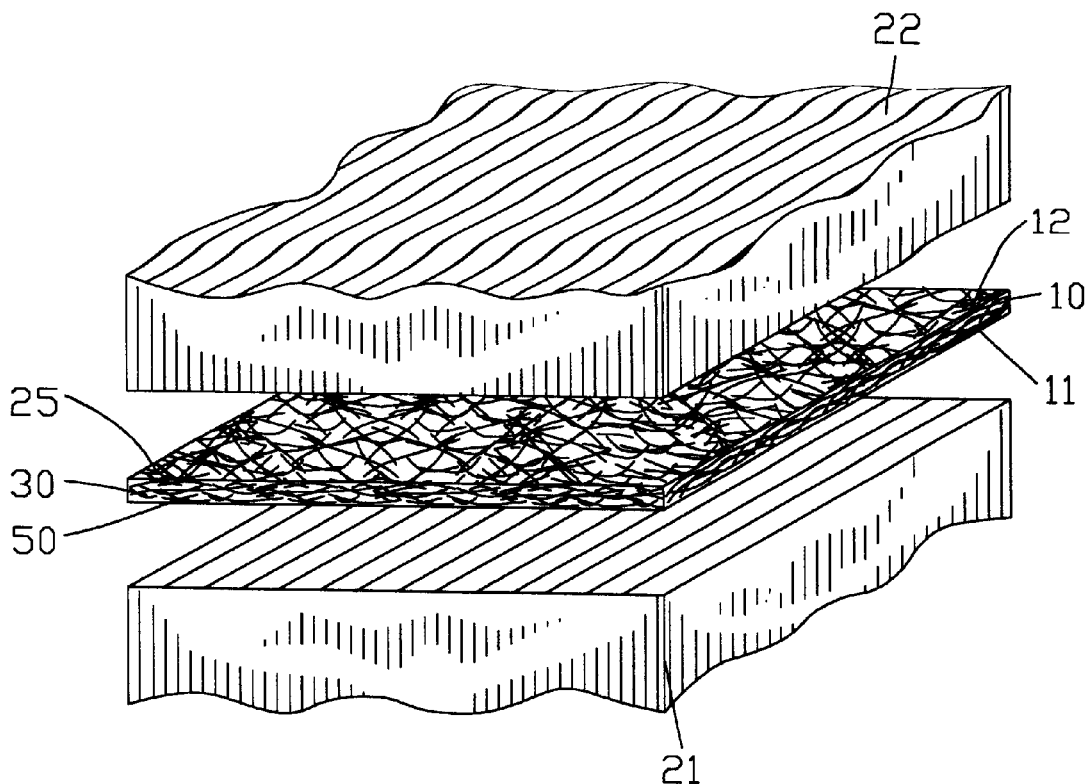
FIG. 3 illustrates a first step in a first example of the method of bonding a first workpiece to a second workpiece showing the first workpiece and the second workpiece with the bonding pad of the present invention positioned therebetween.

FIG. 3 illustrates a first step in a first example of the method of bonding the first workpiece 21 to the second workpiece 22. The first workpiece 21 and the second workpiece 22 are shown with the bonding pad 10 of the present invention positioned therebetween. The first workpiece and second workpieces 21 and 22 are disposed adjacent to the first and second sides 11 and 12 of the bonding pad 10. In this example of the invention, the first and second workpieces are the same type of material as the metallic fibers forming the bonding pad. The metal fibers 30 may comprise randomly oriented stainless steel fibers with the first and second workpieces 21 and 22 being stainless steel workpieces.

Figure 4:
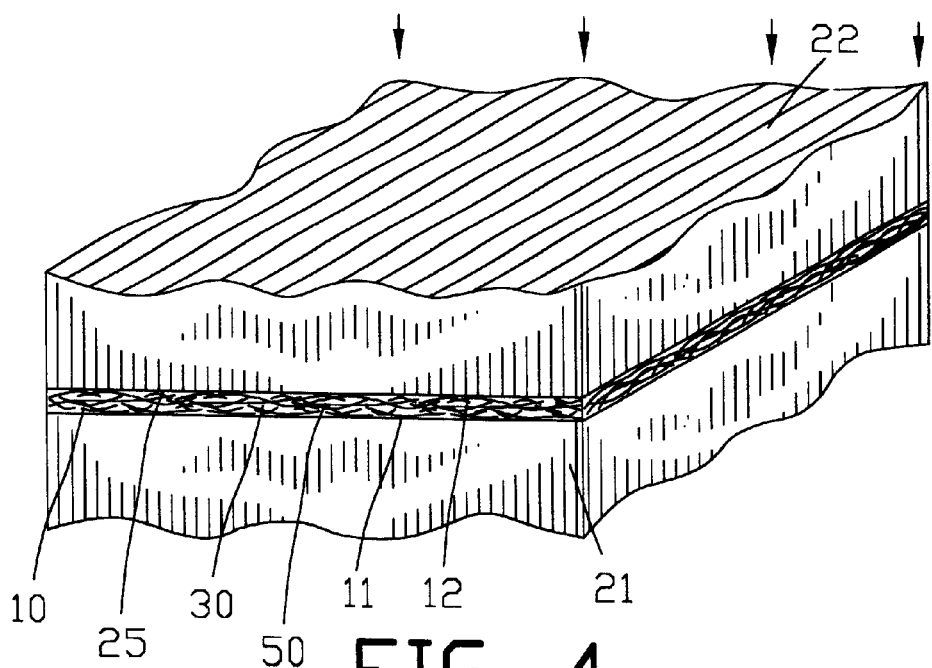
FIG. 4 illustrates a second step in the first example of the method of bonding the first workpiece to the second workpiece showing the engagement of the first workpiece and the second workpiece against opposed sides of the bonding pad.

FIG. 4 illustrates a second step in the first example of the method of bonding the first workpiece 21 to the second workpiece 22 showing the engagement of the first workpiece 21 and the second workpiece 22 against the first and second sides 11 and 12 of the bonding pad 10. Preferably, the first workpiece 21 and the second workpiece 22 are biased against the first and second sides 11 and 12 of the bonding pad 10. In this example, the weight of the second workpiece 22 creates a compressive force to bias the first and second workpieces 21 and 22 against the first and second sides 11 and 12 of the bonding pad 10.

Figure 5:
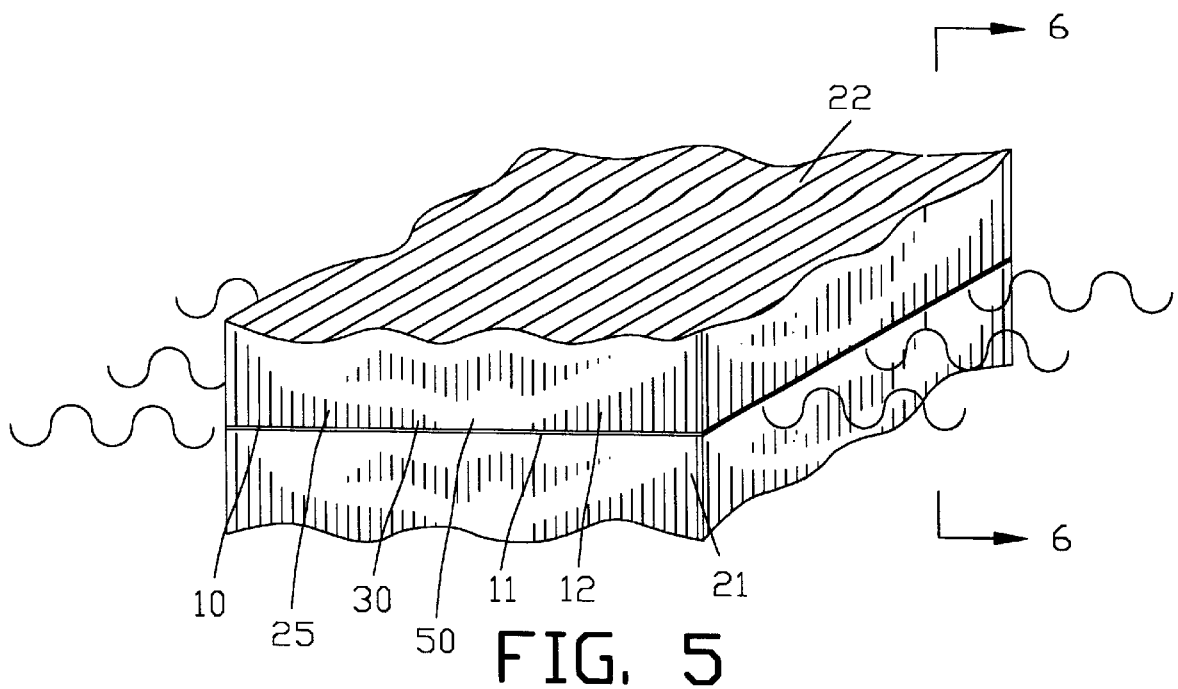
FIG. 5 illustrates a third step in the first example of the method of bonding the first workpiece to the second workpiece showing the application of a compressive force and the application of heat for heating the bonding pad disposed between the first and second workpieces.

FIG. 5 illustrates a third step in the first example of the method of bonding the first workpiece 21 to the second workpiece 21 showing the application of a compressive force and the application of localized heat directed between the first workpiece 21 and the second workpiece 22. The application of localized heat directed between the first workpiece 21 and the second workpiece 22 heats the bonding pad 10 disposed between the first workpiece 21 and the second workpiece 22.

Figure 6:
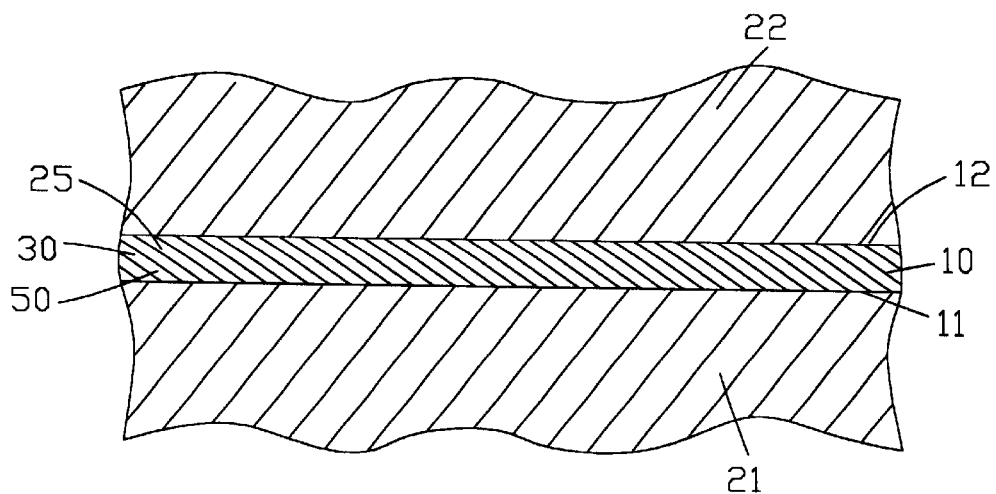
FIG. 6 is a magnified sectional view along line 6—6 in FIG. 5.

FIG. 6 is a magnified sectional view along line 6—6 in FIG. 5. The compressive force of the first workpiece 21 and the second workpiece 22 is applied against the first and second sides 11 and 12 of the bonding pad 10.

Localized heat is applied between the first and second workpiece 21 and 22 and the bonding pad 10 for transforming the metal fibers 30 into a liquid for bonding the first workpiece 21 to the second workpiece 22. Preferably, the localized heat is directed between the first and second workpiece 21 and 22 to provide maximum heating of the bonding pad 10 and minimum heating of the first and second workpiece 21 and 22.

Preferably, the heating of the bonding pad 10 is accomplished in a controlled atmosphere. The bonding pad may be heated within a vacuum, a reactive atmosphere or a non-reactive atmosphere. In one example of the process, the bonding pad 10 is heated within a reducing atmosphere such as hydrogen or any other suitable atmosphere.

After the metal fibers 30 of the bonding pad 10 have been transformed into a liquid, the application of the localized heat is removed from between the first and second workpiece 21 and 22. The liquid metallic fibers solidify to bond the first workpiece 21 to the second workpiece 22. The solidification of the liquid metallic fibers provide an extremely strong bond between the first and second workpiece 21 and 22.

Figure 7:
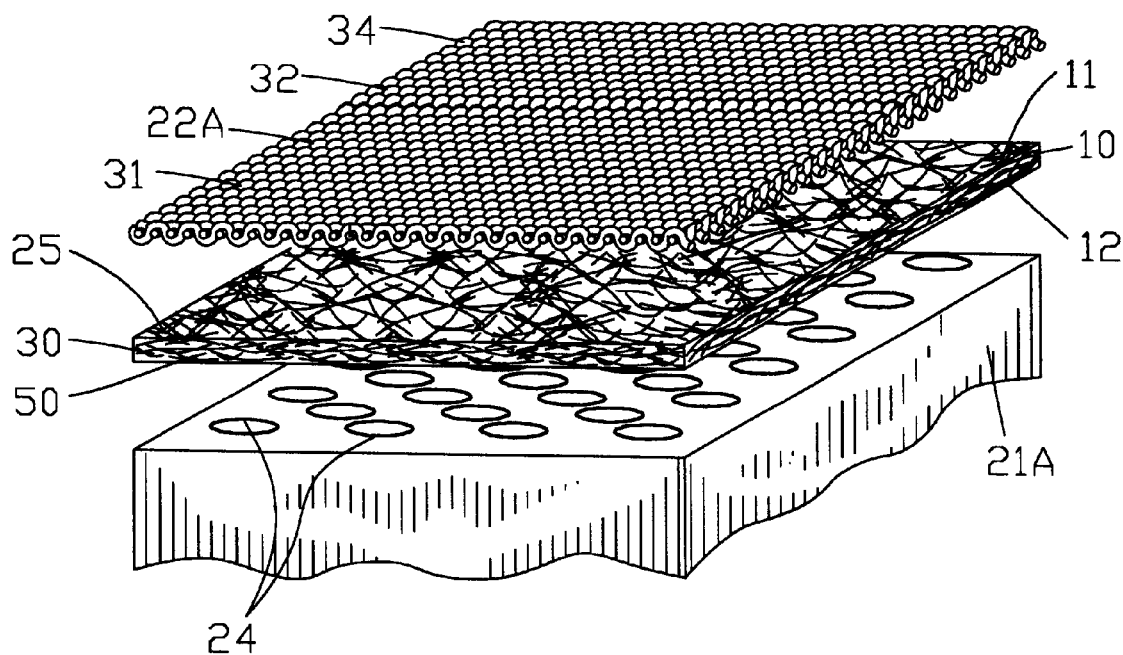
FIG. 7 illustrates a first step in a second example of the method of bonding a first workpiece to a second workpiece showing the first workpiece and the second workpiece with the bonding pad of the present invention positioned therebetween.

FIG. 7 illustrates a first step in a second example of the method of bonding the first workpiece 21 to the second workpiece 22. The bonding pad 10 of the present invention is positioned between the first workpiece 21 to the second workpiece 22. The metal fibers 30 of the bonding pad may comprises randomly oriented stainless steel fibers. In addition, the first and second workpieces 21A and 22A may be stainless steel workpieces.

The first workpiece 21A and the second workpiece 22A are shown disposed adjacent to the first and second sides 11 and 12 of the bonding pad 10. In this example of the invention, the first workpiece 21A is shown as a solid metallic workpieces 21A having a plurality of apertures 24. The second workpiece 22 is shown as a mesh material formed by a plurality of wefts 31 and a plurality of warps 32. The plurality of wefts 31 and warps 32 define a plurality of orifices 34. The second workpiece 22 may be representative of a mesh filter or any other similar structure.

Figure 8:
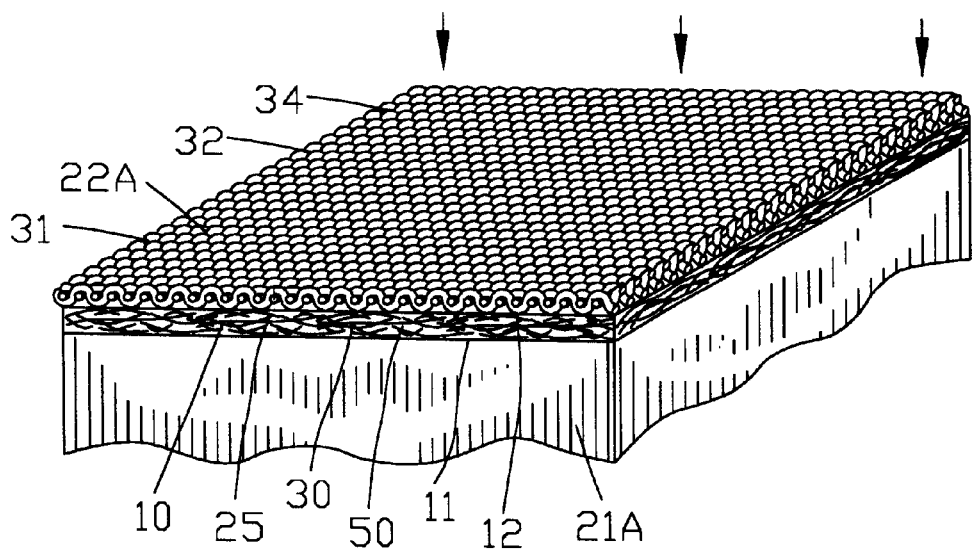
FIG. 8 illustrates a second step in the second example of the method of bonding the first workpiece to the second workpiece showing the engagement of the first workpiece and the second workpiece against opposed sides of the bonding pad.

FIG. 8 illustrates a second step in the second example of the method of bonding the first workpiece 21A to the second workpiece 22A showing the engagement of the first workpiece 21A and the second workpiece 22A against the first and second sides 11 and 12 of the bonding pad 10. The first workpiece 21A and the second workpiece 22A are biased against the first and second sides 11 and 12 of the bonding pad 10 by the weight of the second workpiece 22A.

Figure 9:
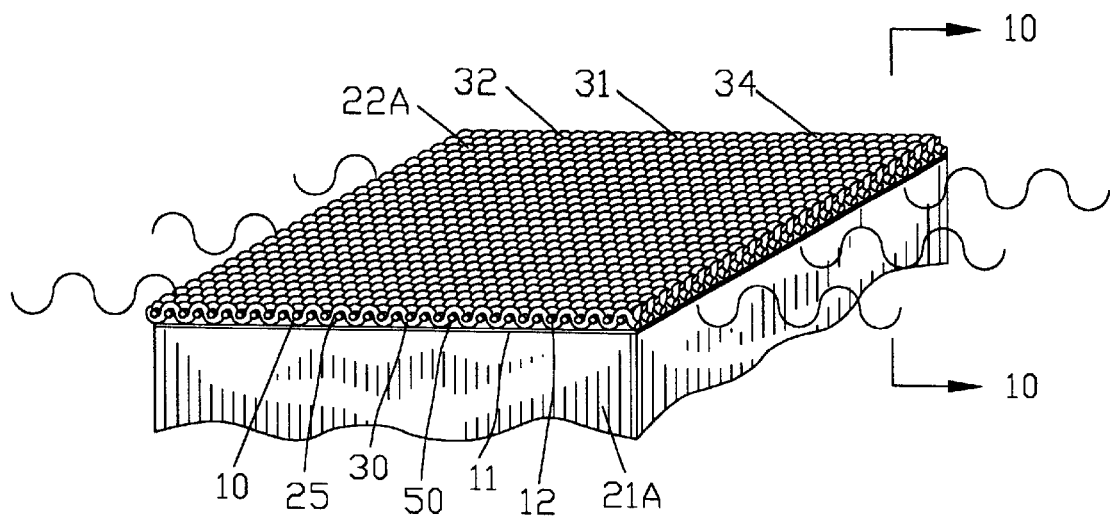
FIG. 9 illustrates a third step in the second example of the method of bonding the first workpiece to the second workpiece showing the application of a compressive force and the application of heat for heating the bonding pad disposed between the first and second workpieces.

FIG. 9 illustrates a third step in the second example of the method of bonding the first workpiece 21A to the second workpiece 22A showing the application of a compressive force and the application of localized heat directed between the first workpiece 21A and the second workpiece 22A. The application of localized heat melts the bonding pad 10 between the first workpiece 21A and the second workpiece 22A.

Figure 10:
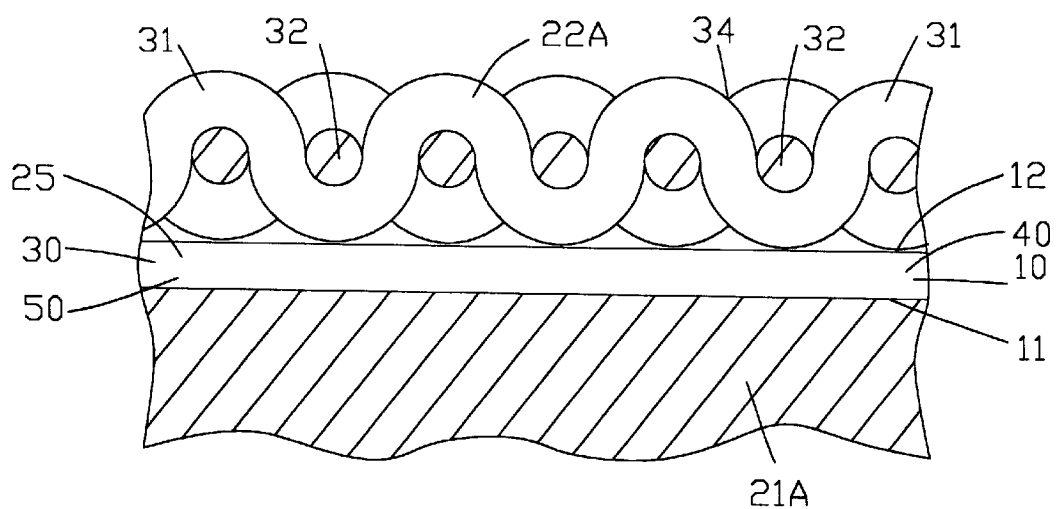
FIG. 10 is a magnified sectional view along line 10—10 in FIG. 9.

FIG. 10 is a magnified sectional view along line 10—10 in FIG. 9. The compressive force of the first workpiece 21A and the second workpiece 22A is applied against the first and second sides 11 and 12 of the bonding pad 10.

Localized heat transforms the metal fibers 30 into a liquid for bonding the first workpiece 21A to the second workpiece 22A with minimal heating of the first and second workpiece 21A and 22A. The heat may be applied in a vacuum or a specialized atmosphere.

After the localized heat is removed, the liquid metallic fibers solidify to bond the first workpiece 21A to the second workpiece 22A. The solidification of the liquid metallic fibers provide an extremely strong bond between the first and second workpiece 21A and 22A.

Figure 11:
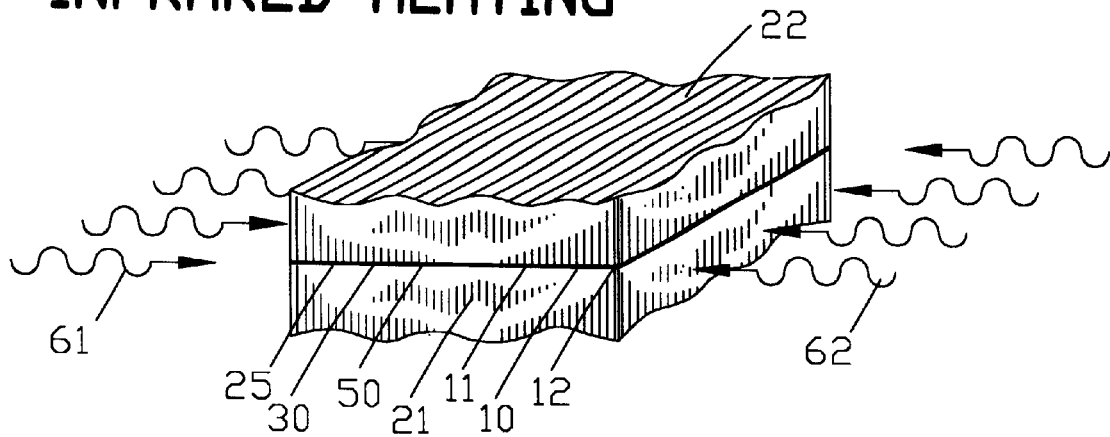
FIG. 11 is a first example of the process of localized heating of the bonding pad by infrared heating.

FIG. 11 is a first example of the process of localized heating of the bonding pad 10 by infrared radiation. Infrared electromagnetic radiation from a first and a second infrared source 61 and 62 is directed between the first and second workpiece 21 and 22 for melting the bonding pad 10. The infrared electromagnetic radiation is concentrated for melting the bonding pad 10 with minimum heating of the first and second workpiece 21 and 22. Preferably, the first and second infrared sources 61 and 62 emit infrared electromagnetic radiation having a wavelength greater than 700 nm.

The infrared electromagnetic radiation transforms the metal fibers 30 into a liquid for bonding the first workpiece 21 to the second workpiece 22. After the infrared electromagnetic radiation is removed, the liquid metallic fibers solidify to bond the first workpiece 21 to the second workpiece 22.

Figure 12:
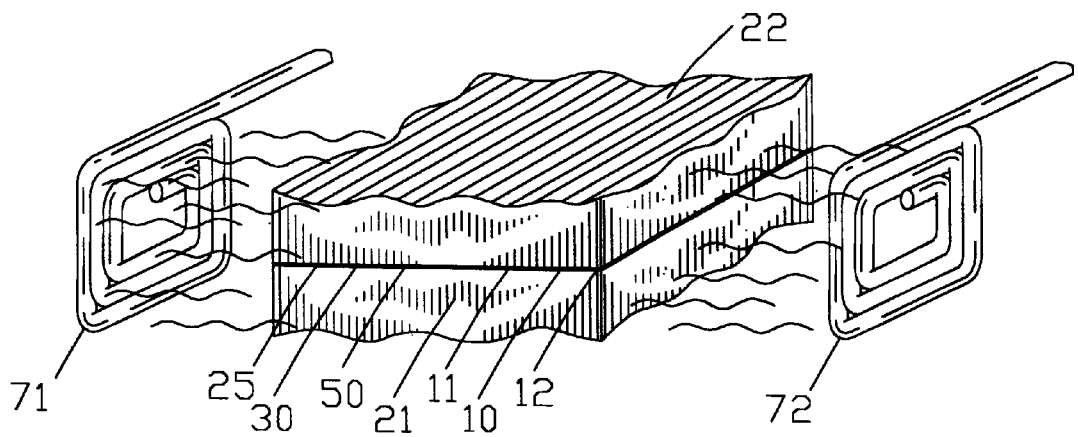
FIG. 12 is a second example of the process of localized heating of the bonding pad by induction heating.

FIG. 12 is a second example of the process of localized heating of the bonding pad 10 by induction heating. The first and second workpieces 21 and 22 and the bonding pad 10 is located between a first and a second induction heating coil 71 and 72. The first and second workpieces 21 and 22 are made of a metallic material and are capable of having eddy currents generated therein by the first and second induction heating coils 71 and 72. The first and second induction heating coils 71 and 72 are positioned to concentrate the eddy currents in proximity to the bonding pad 10.

High frequency (HF) power is applied to the first and second induction heating coils 71 and 72 for inducing eddy currents within the first and second workpieces 21 and 22. The induced eddy currents within the first and second workpieces 21 and 22 heat the first and second workpieces 21 and 22 in proximity to the bonding pad 10. The concentration of the eddy currents provide maximum heating of the bonding pad 10 and minimum heating of the first and second workpiece 21 and 22. Preferably, the high frequency (HF) power is applied to the first and second induction heating coil 71 and 72 for a period of two (2) to five (5) minutes.

The induction heating transforms the metal fibers 30 into a liquid for bonding the first workpiece 21 to the second workpiece 22. After the induction heating is removed, the liquid metallic fibers solidify to bond the first workpiece 21 to the second workpiece 22.

Figure 13:
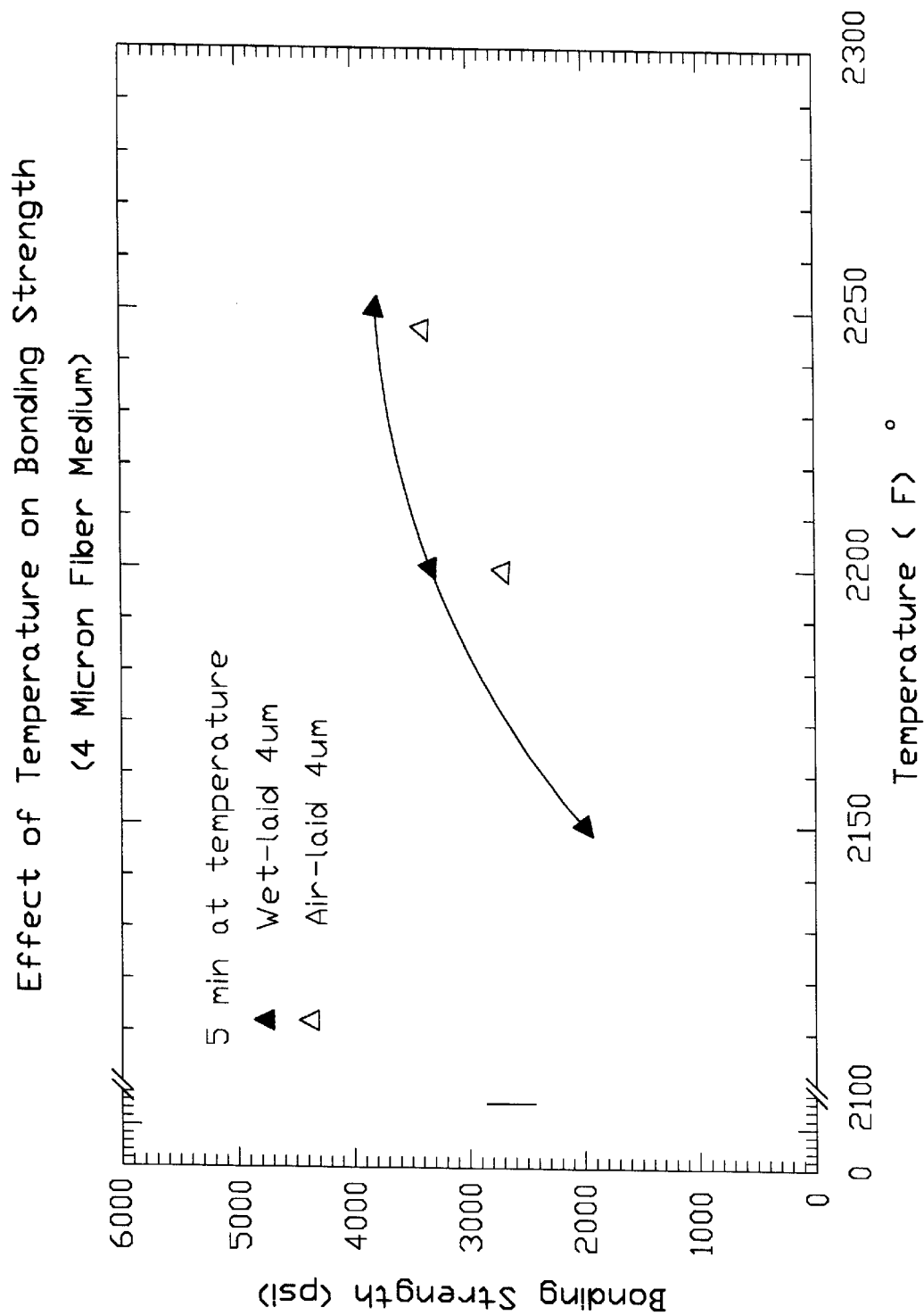
FIG. 13 is a graph of bond strength as a function of temperature illustrating the effect of temperature on bonding strength.

FIG. 13 is a graph of bond strength as a function of temperature illustrating the effect of temperature on bonding strength for a stainless steel bonding pad 10. The bonding pad 10 should be subjected to a temperature of 2250° F. to achieve a bonding strength of approaching 4000 pounds per square inch. A temperature of 2250° F. is above the temperature normally used in a sintering process. FIG. 13 clearly demonstrates that the melting of the bonding pad 10 provides superior strength over the sintering of the same bonding pad 10.

Figure 14:
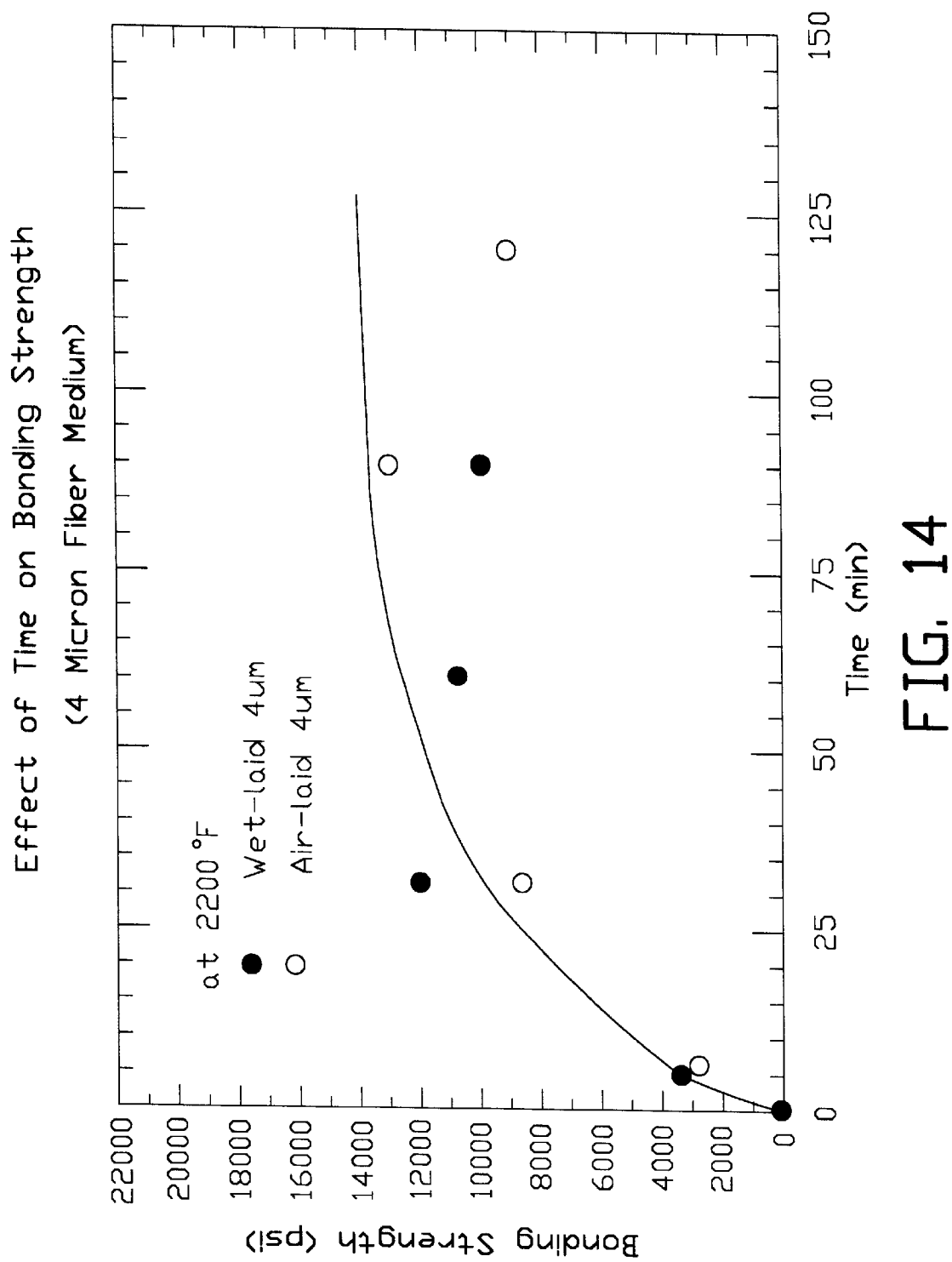
FIG. 14 is a graph of bond strength as a function of time illustrating the effect of time on bonding strength.

FIG. 14 is a graph of bond strength as a function of time illustrating the effect of time on bonding strength. The bonding pad 10 should be subjected to the temperature of 2200° F. for a duration over 100 minutes in order to obtain a bonding strength of 14,000 pounds per square inch.

Figure 15:
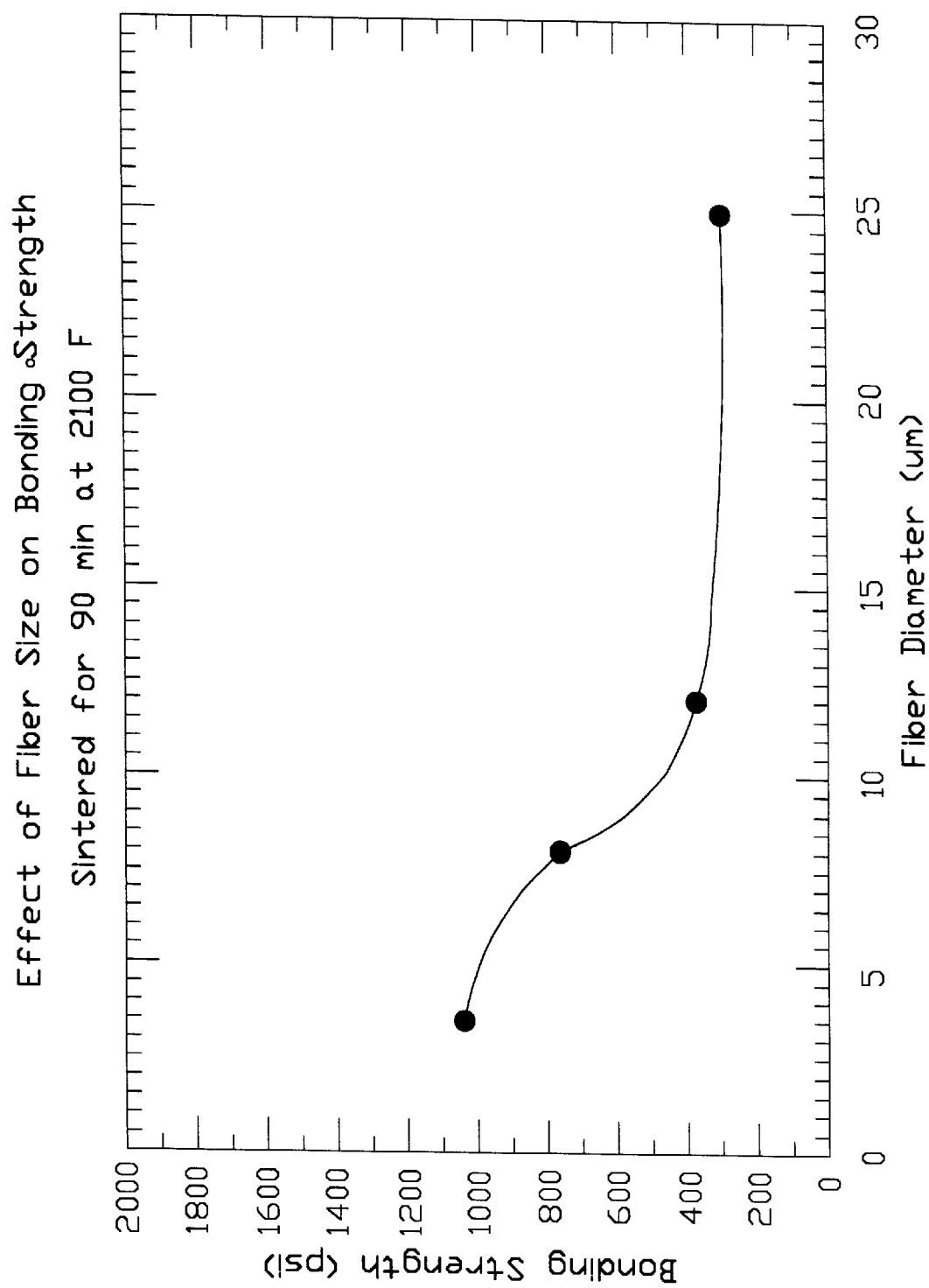
FIG. 15 is a graph of bond strength as a function of fiber diameter illustrating the effect of fiber size on bonding strength.

FIG. 15 is a graph of bond strength as a function of fiber diameter illustrating the effect of fiber size on bonding strength. The curve demonstrates that metallic fibers having a diameter below 5 micron provide the most superior bonding strength of 1000 pounds per square inch.

Figure 16:
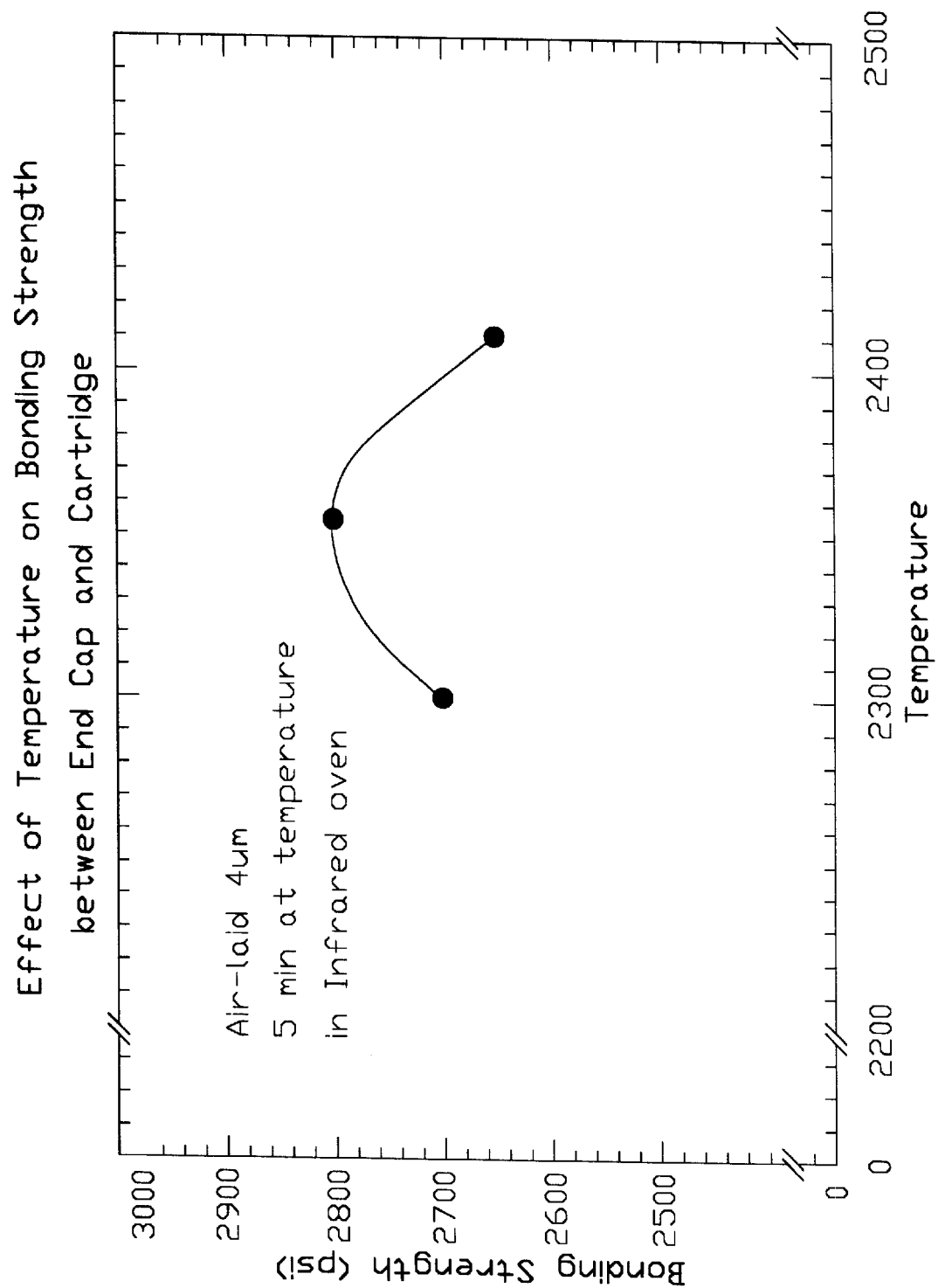
FIG. 16 is a graph of bond strength as a function of temperature illustrating the effect of temperature on bonding strength between an end cap and a filter cartridge.

FIG. 16 is a graph of bond strength as a function of temperature illustrating the effect of temperature on bonding strength between an end cap and a filter cartridge. The curve illustrates that a temperature between 2300° F. and 2400° F. should be obtained in order to attain maximum strength of an end cap and a filter cartridge.

The forgoing has demonstrated that the strength of the bonding pad 10 affixing the first and second workpiece 21 and 22 is determined primarily by the elevation in temperature of the bonding pad 10. The bonding pad 10 must be elevated to temperature to melt the bonding pad 10 to provide proper affixing between the first and the second workpieces 21 and 22. The localized heating allows the bonding pad 10 to be melted without melting the adjacent workpiece 21 and 22 due to the size of the fibers 30 relative to the size of the first and second workpieces 21 and 22. Localized heating allows the bonding pad 10 to be elevated in temperature beyond the temperature normally required for a sintering process. Preferably, the localized heating is done by non-contact heating through either infrared or an action heating. The non-contact heating source provides significant advantages over convection or conduction heating processes of the prior art.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. The process of bonding a first workpiece to a second workpiece, comprising the steps of:
   fabricating a porous bonding pad from a matrix of randomly oriented metallic fibers;
   sintering the porous bonding pad for affixing each of the metallic fibers to adjacent metallic fibers;
   interposing the bonding pad between the first and the second workpiece;
   biasing the first and second workpieces into engagement with the bonding pad; and
   applying heat to the first workpiece to the second workpiece for transforming substantially all of the metallic fibers into a liquid for bonding the first workpiece to the second workpiece.

2. The process of bonding a first workpiece to a second workpiece as set forth in claim 1, wherein the step of fabricating the bonding pad comprises drawing metallic fibers in a wire drawing process to provide a uniform diameter thereof; and
   forming a matrix of randomly oriented metallic fibers to provide the porous bonding pad.

3. The process of bonding a first workpiece to a second workpiece as set forth in claim 1, wherein the step of applying heat includes directing heat between the first and second workpiece.

4. The process of bonding a first workpiece to a second workpiece as set forth in claim 1, wherein the step of applying heat includes concentrating heat between the first and second workpiece.

5. The process of bonding a first workpiece to a second workpiece as set forth in claim 1, wherein the step of applying heat includes directing infrared radiation between the first and second workpiece.

6. The process of bonding a first workpiece to a second workpiece as set forth in claim 1, wherein the step of applying heat includes applying heat in a hydrogen atmosphere for melting at least the surface of each of the metallic bonding fibers.

7. The process of bonding a first workpiece to a second workpiece, comprising the steps of:
   fabricating a porous bonding pad from a matrix of randomly oriented metallic fibers;
   sintering the porous bonding pad for affixing each of the metallic fibers to adjacent metallic fibers;
   interposing the bonding pad between the first and the second workpiece;
   biasing the first and second workpieces into engagement with the bonding pad; and
   applying heat to the first workpiece to the second workpiece for transforming substantially all of the metallic fibers into a liquid for bonding the first workpiece to the second workpiece upon solidification of the liquefied metallic fibers.

8. The process of bonding a first workpiece to a second workpiece as set forth in claim 7, wherein the step of fabricating the porous bonding pad includes drawing a metallic wire to provide a metallic fiber having a cylindrical diameter less than 50 micrometers; and
   fabricating the porous bonding pad from a matrix of randomly oriented metallic fibers.

9. The process of bonding a first workpiece to a second workpiece as set forth in claim 7, wherein the step of fabricating the porous bonding pad includes drawing a metallic wire to provide a metallic fiber having a cylindrical diameter less than 50 micrometers; and
   fabricating the porous bonding pad from a matrix of randomly oriented metallic fibers to provide a resilient bonding pad.

10. The process of bonding a first workpiece to a second workpiece as set forth in claim 7, wherein the step of applying heat includes directing heat between the first and second workpiece.

11. The process of bonding a first workpiece to a second workpiece as set forth in claim 7, wherein the step of applying heat includes concentrating heat between the first and second workpiece.

12. The process of bonding a first workpiece to a second workpiece as set forth in claim 7, wherein the step of applying heat includes directing infrared radiation between the first and second workpiece.

13. The process of bonding a first workpiece to a second workpiece as set forth in claim 7, wherein the step of applying heat includes applying heat in a hydrogen atmosphere for melting at least the surface of each of the metallic bonding fibers.

* * * * *